May 14, 1929.  R. B. ZUBER  1,712,723
SHEARS
Filed June 19, 1928  3 Sheets-Sheet 2
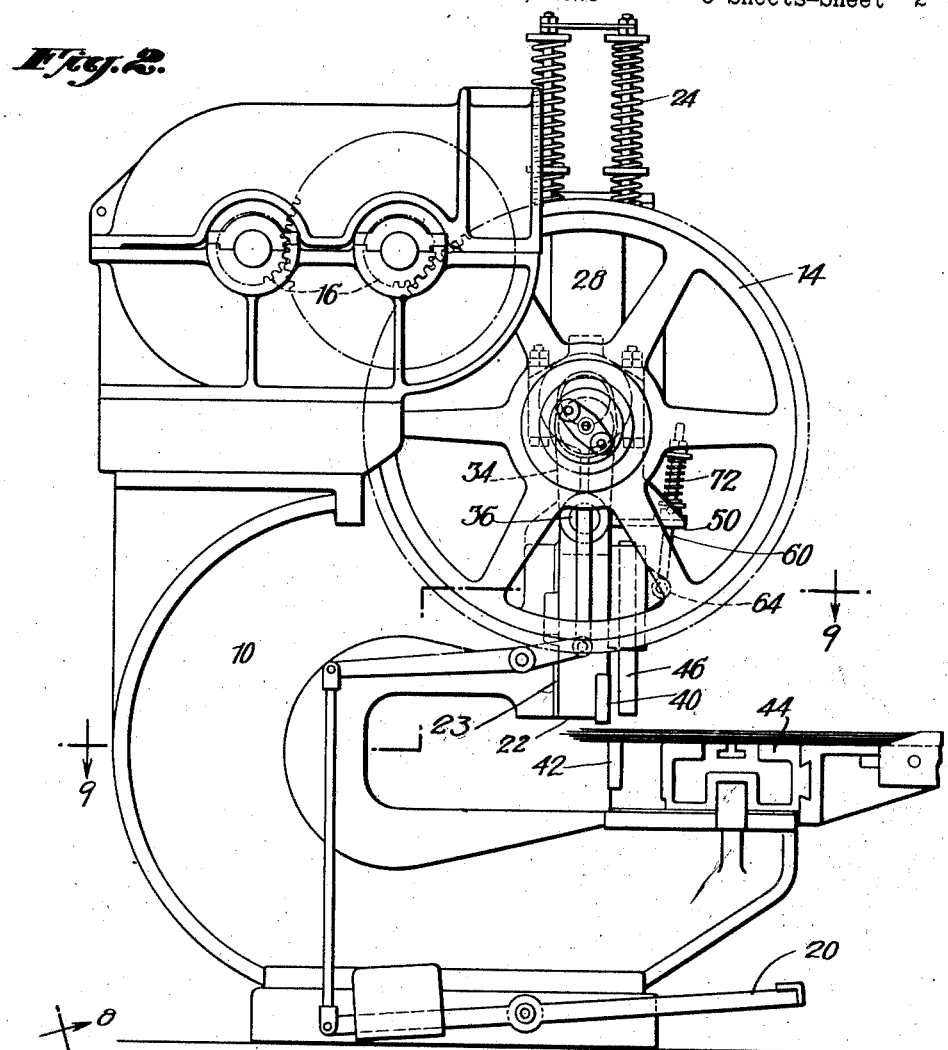
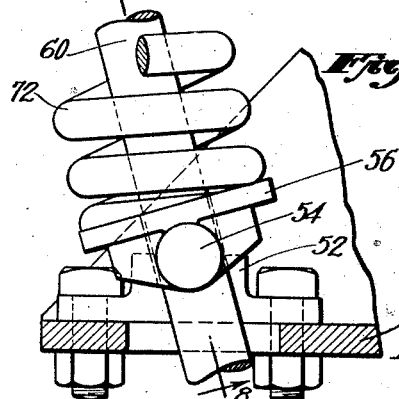
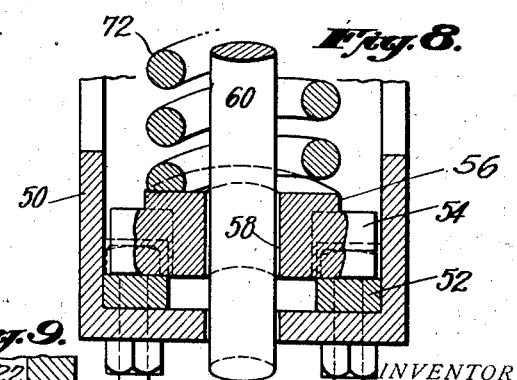
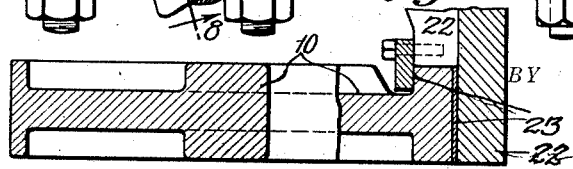
INVENTOR
Robert B. Zuber.
ATTORNEY May 14, 1929.    R. B. ZUBER    1,712,723
SHEARS
Filed June 19, 1928    3 Sheets-Sheet 3
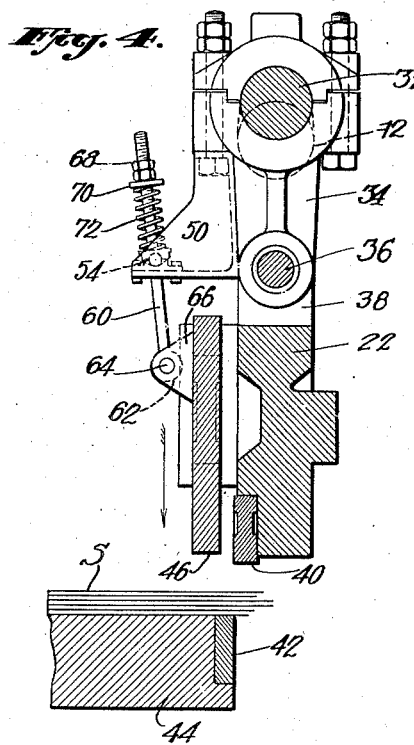
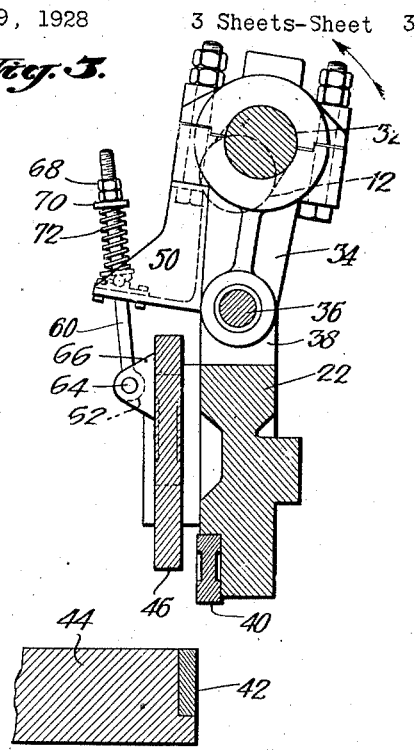
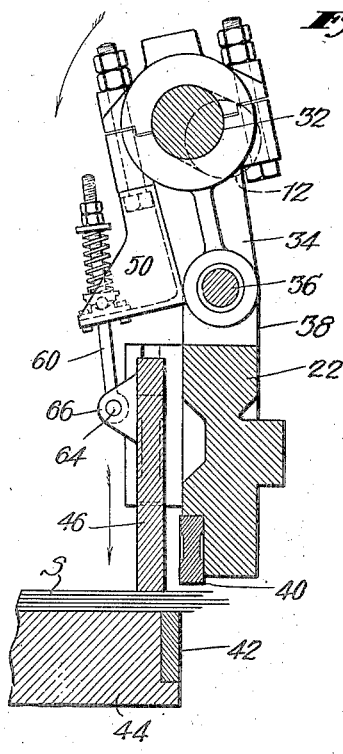
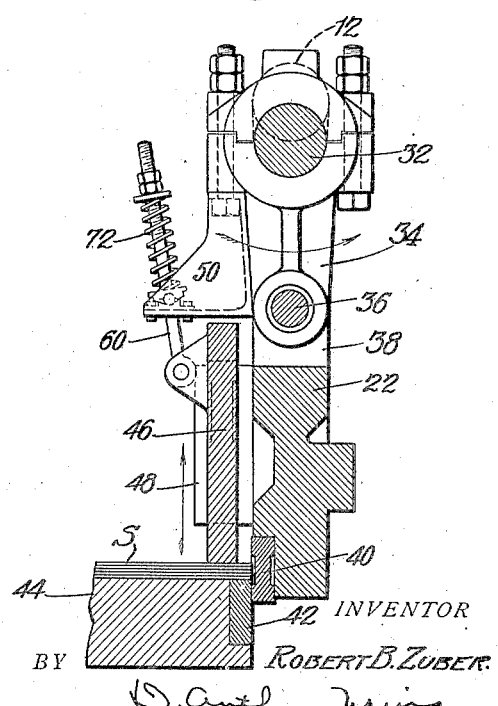
INVENTOR
ROBERT B. ZUBER
BY
ATTORNEY Patented May 14, 1929.

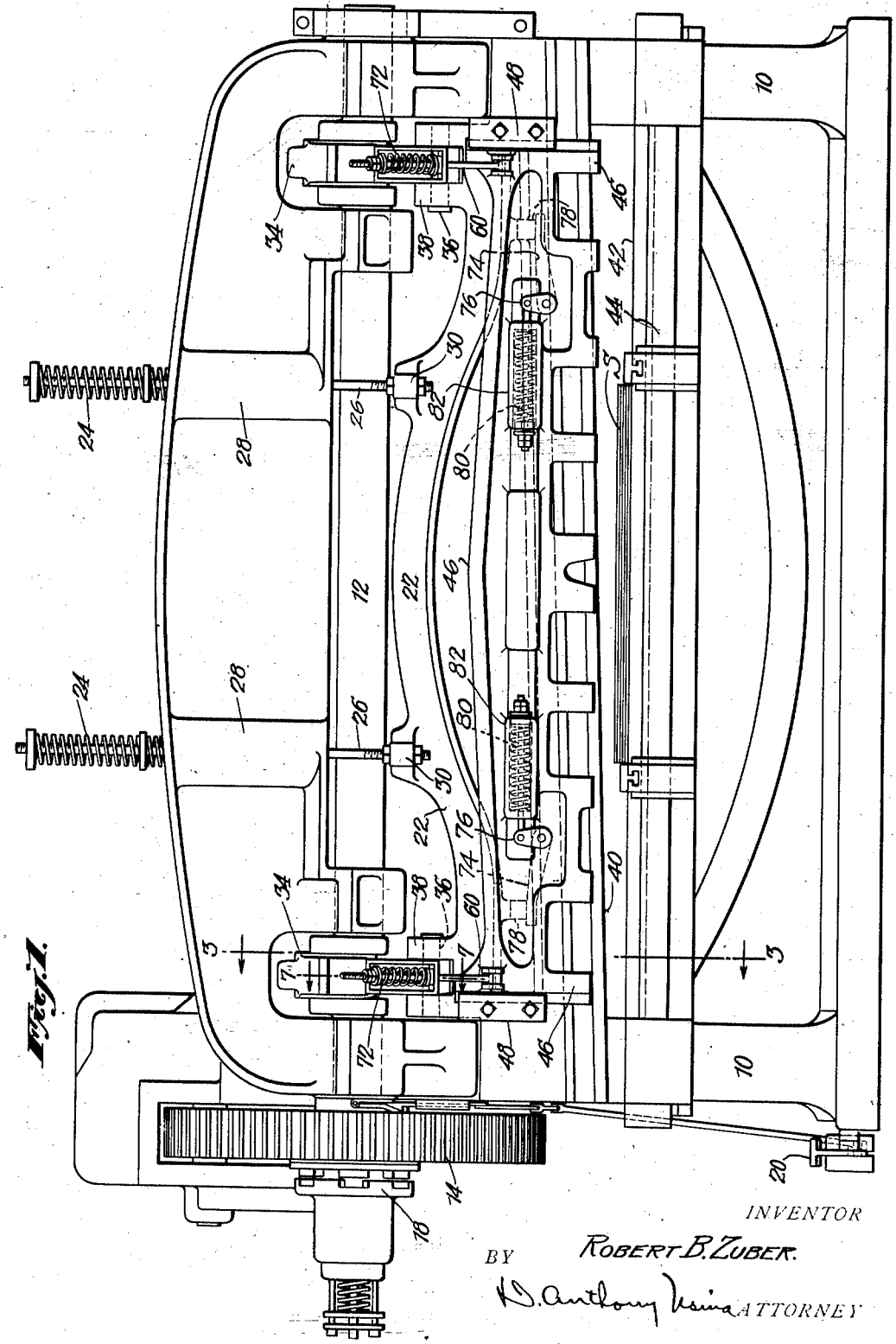

1,712,723

UNITED STATES PATENT OFFICE.

ROBERT B. ZUBER, OF BIRMINGHAM, ALABAMA.

SHEARS.

Application filed June 19, 1928. Serial No. 286,504.

This invention relates to improvements in shears such as used for cutting sheets of metal and the like and aims to provide a clamp or gag adapted to hold the material being sheared and so arranged that upon the retraction of the shear, the gag or clamp will be lifted to the position above the lowermost cutting edge of the shear blade. In the shears heretofore used for the shearing of sheet metal, paper or similar sheet materials, it is customary to provide a gag or clamp for holding the material during the shearing operation. Such gags work either in guides on the shear housing or in guides on the knife head and they are usually propelled up and down by the knife head, the gags being free to slide in the aforementioned guides except as controlled by their connections to knife head. In usual constructions, the knife head can continue its stroke after the gag has engaged the work, and stops, because springs or yieldable connections are interposed between the knife head and the gag. As thus arranged, it is clear that the lower face of the gag must be arranged in such manner that it will be lower than or in advance of the cutting edge of the knife so as to engage and press against the stock to be sheared before such cutting edge reaches the stock.

With this prior arrangement, it is also clear that with the knife in retracted position from the work, the lower edge of the gag will be in a plane either coinciding with or lower than the lowest point of the cutting edge of the knife, thus, the clearance above the bed in the prior apparatus is always less than the distance between the bed and the operative part of the cutting edge. It frequently happens that this clearance opening is so restricted because of the interference of the gag that the net opening is not sufficient to permit the insertion of warped or distorted sheets.

My invention provides a novel means for increasing the lift of the gag and thereby increasing the clearance opening between the underside of the gag and the knife bed but without increasing the travel of the knife head. An embodiment of the invention is illustrated in the accompanying drawings in which—

Fig. 1 is a front elevation of a shear equipped with my improved gag operating mechanism;

Fig. 2 is a view from the left side of Fig. 1;

Figs. 3, 4, 5 and 6 are cross-sectional views taken on a plane indicated by the line 3—3 of Fig. 1, illustrating successive positions of the gag and the knife blade;

Fig. 7 is an enlarged fragmentary detail section taken on line 7—7 of Fig. 1;

Fig. 8 is a vertical section on line 8—8 of Fig. 7;

Fig. 9 is a horizontal section on line 9—9 of Fig. 2 indicating arrangement of guides for knife head.

Referring in detail to the drawings, 10 represents the frame of a known type of shear which carries a crank shaft 12 having a fly wheel 14 loosely mounted at one end thereof, this wheel being in the form of a gear meshing with gearing indicated generally at 16 by means of which power is transmitted to the shear. The crank shaft 12 carries a clutch member 18 which when engaged with jaws carried by the fly wheel establishes a driving connection between the gearing 16 and crank shaft 12. The clutch 18 is of known construction and is preferably under manual control of an operator and is arranged to be engaged upon the depression of a foot treadle 20. The clutch and its trip mechanism form no part of the present invention and are, therefore, not shown and described in detail.

A knife head 22 is slidably mounted in the usual manner around guide faces 23 on the shear frame 10 as shown in Fig. 9, and its weight is counter-balanced by springs 24 embracing rods 26 passing through bosses 28 in the shear frame and secured at their lower ends to lugs 30 forming part of the knife head.

Engaging the crank pins 32 of the crank shaft 12 is a pair of pitmen 34, the lower ends of which are connected by means of pins 36 to ears 38 formed on the knife head 22. As thus arranged, it is clear that rotation of crank shaft 12 will reciprocate the knife head 22. This knife head at its lower end carries a shear blade 40 which is adapted to coact with a fixed ledger blade 42 secured to the bed or work table 44 of the machine.

My improved gag 46 is slidably mounted in guides 48 carried by the reciprocating knife head 22.

For positioning the gag relatively to the knife, novel means are provided whereby after the knife has made its cutting movement, the gag is lifted to a position in which its lowermost edge is in a plane above the lowermost edge of the movable knife 40. The knife as indicated in Fig. 1 is so arranged with respect to the work table that its cutting edge is at a small angle thereto so as to produce the customary shearing action. It is noted, however, that with the gag in the retracted position shown in Fig. 1, the left end of the gag is considerably higher than the left end of the knife blade.

To bring about this relative position of the gag and the knife without increasing the stroke of the knife, I provide brackets 50 which extend laterally from the pitmen 34. Each bracket 50 carries a pair of saddles 52 for coaction with trunnions 54 carried by a spring seat 56. The spring seat 56 is provided with an aperture 58 through which freely extends a rod 60, one end of which is formed with an enlarged eye 62 (Fig. 4). A pin 64 secured to ears 66 formed on the gag passes through the eye 62 and forms a pivotal union with the rod 60. The upper end of the rod 60 is screw threaded for reception of adjusting nuts 68 which engage a collar 70 which in turn coacts with a spring 72 surrounding the rod.

In order to yieldingly transmit motion from the knife head 22 on the down stroke thereof to the gag 46, bell cranks as shown in Fig. 1 are mounted on the gag and they have arms 74 and 76 coacting, respectively, with lugs 78 on the knife head and compression springs 80 carried in hollow bosses 82 formed on the gag.

The springs 80 tend to rock the arms 74 and hold them against the lugs 78 and the arrangement provides a yielding connection between the gag and knife head so that after the gag engages the work, continued downward motion of the knife head transmits a yielding pressure through the gag to the work, the springs 80 being compressed by this action.

In operation, the clutch 18 is automatically tripped and the parts come to rest in substantially the position indicated in Fig. 3. Considering the crank shaft rotating counter-clockwise as indicated by the arrows in Figs. 3 to 6, during the first part of movement of the pitman, the knife moves slightly up and then down while the gag approaches the sheets S to be cut. Continued rotation brings the pitman to the inclined position of Fig. 5 and since the trunnions 54 revolve around the center of pin 36 as well as drop with it, the gag 46, travels faster than the knife head and engages the sheets to be cut prior to the engagement of the knife 40 therewith. As the crank pin 32 continues to travel downward to the position of Fig. 6, the pitman straightens out as indicated in that figure. During this part of the stroke, the spring 72 expands and the pressure exerted by the gag holds the sheets in place while being sheared. As the crank pin 32 continues its counter-clockwise rotation, the knife is lifted and because of the offset relationship between the pin 36 and the trunnions 54 and guide for rod 60, an increased upward movement over that of the knife head is imparted to the gag and it is thus elevated to a position, for example, that of Fig. 3 in which its lowermost edge is retracted to a height considerably above the lower edge of the knife 40.

Thus, ample clearance is provided so that bent or distorted sheets may be readily inserted below the cutting edge of the knife. From the foregoing, it is apparent that the gag is given an increased lift relative to the knife head and obtains a position where it will not interfere with the insertion of work and the increased clearance is provided without necessitating any increase in the stroke of the knife. The invention may be applied to existing types of shears and by its application readily and cheaply overcome defects in existing equipment. On new equipment, bracket 50 would preferably be an integral part of pitman 34.

While I have described quite specifically the embodiment of the invention illustrated, it is not to be construed that I am limited thereto since various modifications and substitution of equivalents may be made by those skilled in the art without departing from the invention as defined in the appended claims. For instance, an eccentric may be used instead of the crank construction shown, and the invention can be applied to an under-driven shear as well as to the over-driven type shown.

What I claim is:—

1. In a shear for cutting sheets having a reciprocating head carrying a knife blade and a sheet holding gag, slidable relative to said head, means for automatically lifting the bottom of said gag to a position above the lowest end of the cutting edge of said knife blade after the latter has made its cutting stroke.

2. In a shear for cutting sheets having a reciprocating head carrying a knife blade and a sheet holding gag slidable relative to said head, automatic means for positively lifting said gag relatively to the lowest end of said knife blade.

3. In a shear for cutting sheets having a knife head and guides therefor, a crank shaft and pitman for reciprocating said head, a knife blade secured to said head, a sheet holding gag slidable relative to said knife head and means carried by said pitman and connected to said gag arranged to lift the gag.

4. In a shear for cutting sheets having a knife head and guides therefor, a crank shaft and pitman for reciprocating said head, a knife blade secured to said head, a sheet holding gag slidable relative to said knife head and means responsive to the movement of said pitman for lifting the gag relatively to said knife head.

5. In a shear for cutting sheets having a knife head and guides therefor, a crank shaft and pitman for reciprocating said head, a knife blade secured to said head, a sheet holding gag slidable relative to said knife head and means for yieldingly suspending the gag from said pitman.

6. In a shear for cutting sheets having a knife head and guides therefor, a crank shaft and pitman for reciprocating said head, a knife blade secured to said head, a sheet holding gag slidable relative to said knife head and a yielding connection between the gag and said pitman.

7. In a shear for cutting sheets having a knife head and guides therefor, a crank shaft and pitman for reciprocating said head, a knife blade secured to said head, a sheet holding gag slidable relatively to said knife head, a bracket secured to said pitman, a rod pivotally engaging said gag and spring means carried by said rod and coacting with said bracket for yieldingly connecting the gag with said pitman.

In witness whereof, I have hereunto signed my name.

ROBERT B. ZUBER.